United States Patent [19]

Higuchi

[11] Patent Number: 5,463,608
[45] Date of Patent: Oct. 31, 1995

[54] APPARATUS FOR REPRODUCING OPTICAL RECORD MEDIUM

[75] Inventor: Takanobu Higuchi, Tsurugashima, Japan

[73] Assignee: Pioneer Electronic Corporation, Tokyo, Japan

[21] Appl. No.: 404,538

[22] Filed: Mar. 15, 1995

[30] Foreign Application Priority Data

Mar. 17, 1994 [JP] Japan .................. 6-047562

[51] Int. Cl.$^6$ .................................. G11B 7/135
[52] U.S. Cl. .................. 369/109; 369/110; 369/112
[58] Field of Search ................... 369/109, 110, 369/111, 112, 120, 117, 44.37, 44.38, 44.24; 347/206

[56] References Cited

U.S. PATENT DOCUMENTS

| | | | |
|---|---|---|---|
| 4,449,215 | 5/1984 | Reno | 369/111 |
| 4,682,315 | 7/1987 | Uejima | 369/110 |
| 4,691,308 | 9/1987 | Takagi et al. | 369/110 |
| 4,985,880 | 1/1991 | Yoshida et al. | 369/110 |
| 5,124,868 | 6/1992 | Matsubayashi et al. | 369/110 |
| 5,195,072 | 3/1993 | Fukui et al. | 369/112 |
| 5,218,582 | 6/1993 | Marchant | 369/112 |
| 5,325,350 | 6/1994 | Morimoto et al. | 369/120 |

*Primary Examiner*—Loha Ben
*Attorney, Agent, or Firm*—Nixon & Vanderhye

[57] ABSTRACT

An reproducing apparatus reproduces an optical record medium by irradiating the optical record medium with a reading light. The apparatus is provided with: a light irradiation device for irradiating the optical record medium with the reading light; a separation device for separating the reading light reflected by the optical record medium into a first light component which has a first polarization condition and a second light component which has a second polarization condition; a first receiving device for receiving the separated first light component, and outputting a first readout signal indicating the first light component; a second receiving device for receiving the separated second light component, and outputting a second readout signal indicating the second light component; a reproduction device for reproducing information recorded in the optical record medium in response to the readout signals; a first differential signal output device for outputting a first differential signal representing a difference between the first and second readout signals; a double refraction eliminating device for eliminating an effect of double refraction from the first differential signal, and outputting a second differential signal; and a control device for controlling a power of the reading light from the light irradiation device in response to the second differential signal.

6 Claims, 10 Drawing Sheets

F I G. 10
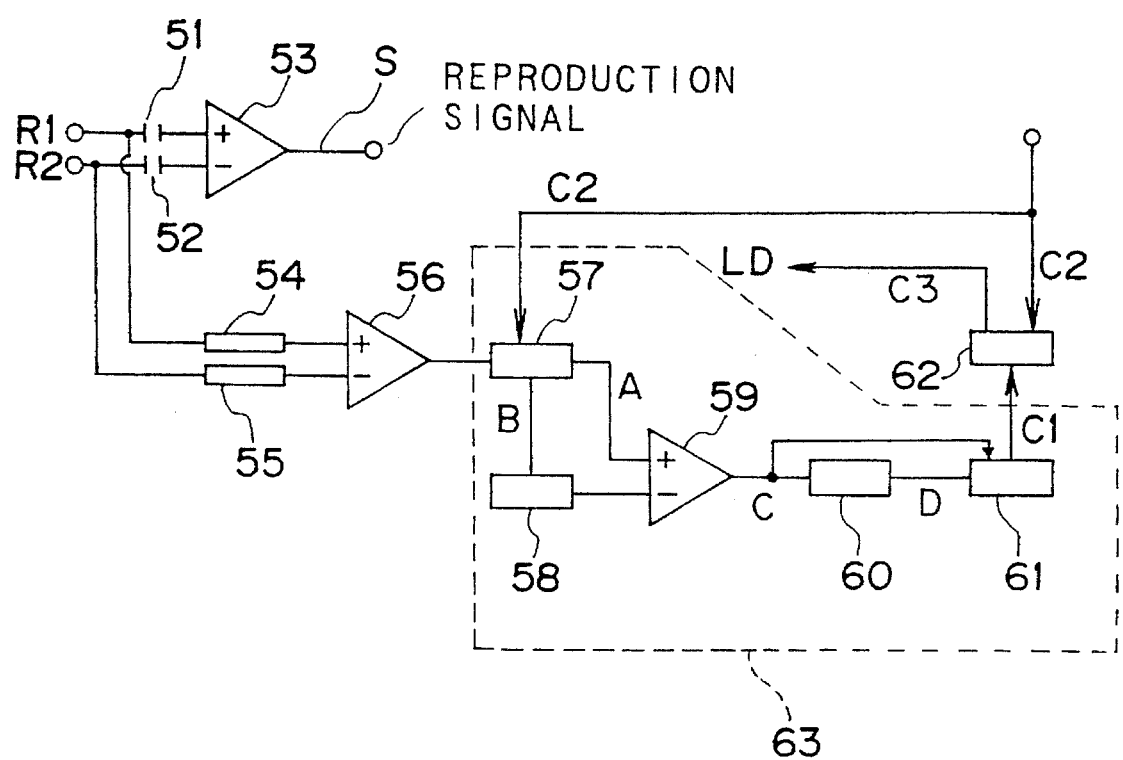

APPARATUS FOR REPRODUCING OPTICAL RECORD MEDIUM

BACKGROUND OF THE INVENTION

1. Field of the Invention

The present invention generally relates to an apparatus for reproducing an optical record medium. More particularly, it relates to an apparatus for reproducing an optical record medium to which information, having a spatial frequency higher than a spacial frequency prescribed by a wave length of a reading light and a numerical aperture of an objective lens at the time of reproduction, is recorded.

2. Description of the Related Art

Information corresponding to the existences of the phase pits of an optical disk, such as a CD (Compact Disk) and a LD (Laser Disk), is reproduced by detecting the reduction in the reflection light amount, which is caused by a light diffraction, a light scattering and a change in the optical constant of pit portions when the light spot of the reading light is formed on the pit portions, by use of an optical detecting device. More concretely, the information is reproduced based on the following facts. Namely, on one hand, when the reading light spot is positioned on the pit, the amount of the returning light is small because of the diffraction etc. On the other hand, the amount of the returning light is large when the reading light spot is positioned on the non-pit portion between the pits.

This kind of optical disk has the following problems. Namely, the reproduction resolution of the optical disk is restricted by a wavelength $\lambda$ of a reading light such as a reading laser beam, and a numerical aperture NA of an objective lens at the time of reproduction. The information, which includes a frequency component exceeding the spatial frequency $fc=2 NA/\lambda$, cannot be reproduced from the optical disk.

To overcome the above problems, an apparatus for reproducing an optical record medium, to which information having a spatial frequency higher than a spacial frequency prescribed by a wave length of a reading light and a numerical aperture of an objective lens at the time of reproduction is recorded, was developed. In order to make a reproduction of the information having a frequency component exceeding the spatial frequency $fc=2 NA/\lambda$, hereinafter referred to as "super resolution reproduction", a low temperature domain is produced within a light spot of a light beam emitted from a laser diode on the optical record medium.

However, the size of the low temperature domain is varied because of the differences of the light sensitivity of the material used for the optical record medium, room temperature, the power of the light beam etc. Therefore, since the size of the low temperature domain is varied because of the above mentioned reasons, the voltage of the reproduction signal is unstable, and the amount of crosstalk in the reproduction signal and error rate included in the reproduction signal are increased. As a result, the super high resolution reproduction becomes unstable.

SUMMARY OF THE INVENTION

Accordingly, an object of the present invention is to substantially eliminate defects or drawbacks encountered in the prior art and to provide an apparatus for reproducing an optical record medium, which make a stable super resolution reproduction.

According to the present invention, the above mentioned object can be achieved by providing, in one aspect, an apparatus for reproducing an optical record medium by irradiating the optical record medium with a reading light. The apparatus includes: a light irradiation device for irradiating the optical record medium with the reading light; a separation device for separating the reading light reflected by the optical record medium into a first light component which has a first polarization condition and a second light component which has a second polarization condition; a first receiving device for mainly receiving the separated first light component and outputting a first readout signal indicating the received light component; a second receiving device for mainly receiving the separated second light component and outputting a second readout signal indicating the received light component; a reproduction device for reproducing information recorded in the optical record medium in response to the first and second readout signals; a first differential signal output device for outputting a first differential signal representing a difference between the first readout signal and the second readout signal; a double refraction eliminating device for eliminating an effect of double refraction caused by a reflection of the reading light on the optical record medium from the first differential signal, and outputting a second differential signal; and a first control device for controlling a power of the reading light from the light irradiation device so that a direct-current component of the second differential signal is constant.

According to the construction of the present invention, the separation device separates the reading light reflected by the optical record medium into the first light component which has the first polarization condition and the second light component which has the second polarization condition. Each of the first and second light components is respectively received by the first receiving device and the second receiving device. And each of the first and second receiving device respectively outputs the first and second readout signals respectively indicating the received light components. The first differential signal output device outputs the first differential signal representing a difference between the first readout signal and the second readout signal. The first differential signal includes information of the effect of the double refraction and information of size of the low temperature domain. The first control device controls the power of the reading light from the light irradiation device so that the direct-current component of the second differential signal, which is supplied from the double refraction eliminating device after the effect of the double refraction is eliminated, is constant. Since the effect of double refraction is eliminated by the double refraction eliminating device, the direct-current component of the second differential signal represents only the size of the low temperature domain.

Thus, since the first control device controls the laser power of the irradiation device so that the direct-current component of the second differential signal may be constant, the size of the low temperature domain becomes stable. Therefore, the super resolution reproduction can be stable.

The apparatus may include: a light power switching device for switching the power of the reading light from the light irradiation device between a high power and a low power; and the double refraction eliminating device may include: a second differential signal output device for outputting a second differential signal representing a difference between the first differential signal in case of the reading light from the irradiation device having the high power and the first differential signal in case of the reading light from the irradiation device having the low power.

Further, the double refraction eliminating device may include: a differentiating device for differentiating the second differential signal, and outputting a differentiated signal of the second differential signal; and a second control device for controlling the power of the reading light from the light irradiation device so that a deviation of the second differential signal at a time of the differentiated signal being zero is minimized.

According to anther aspect of the present invention, an apparatus for reproducing an optical record medium by irradiating the optical record medium with a reading light, includes: a light irradiation device for irradiating the optical record medium with the reading light; a first separation device for separating the reading light from the light irradiation device into a first reading light having a first power and a second reading light having a second power being smaller than the first power; a second separation device for separating the first reading light reflected by the optical record medium into a first light component which has a first polarization condition and a second light component which has a second polarization condition, and separating the second reading light reflected by the optical record medium into the first light component which has the first polarization condition and the second light component which has the second polarization condition; a first receiving device for receiving the separated first light component of the first reading light and outputting a first readout signal indicating the received first light component of the first reading light; a second receiving device for receiving the separated second light component of the first reading light and outputting a second readout signal indicating the received second light component of the first reading signal; a third receiving device for receiving the separated first light component of the second reading light and outputting a third readout signal indicating the received first light component of the second reading light; a fourth receiving device for receiving the separated second light component of the second reading light and outputting a fourth readout signal indicating the received second light component of the second reading signal; a reproduction device for reproducing information recorded in the optical record medium in response to the first and second readout signals; a first differential signal output device for outputting a first differential signal representing a difference between the first readout signal and the second readout signal; a second differential signal output device for outputting a second differential signal representing a difference between the third readout signal and the fourth readout signal; a double refraction eliminating device for eliminating an effect of double refraction caused by a reflection of the first reading light on the optical record medium in response to the first and second differential signals, and outputting a third differential signal; and a first control device for controlling a power of the reading light from the light irradiation device so that a direct-current component of the second differential signal is constant.

According to the construction of the another aspect of the present invention, the first separation device separates the reading light from the light irradiation device into the first reading light having the first power, in which by using the first reading light the super resolution reproduction is performed, and the second reading light having the second power being smaller than the first power, in which by using the second reading light beam the super resolution reproduction is not performed but a conventional reproduction is performed. The second separation device separates the first reading light reflected by the optical record medium into the first light component which has the first polarization condition and the second light component which has the second polarization condition. The second separation device further separates the second reading light reflected by the optical record medium into the first light component which has the first polarization condition and the second light component which has the second polarization condition.

The first differential signal output device outputs the first differential signal representing a difference between the first readout signal indicating the first light component of the first reading light received by the first receiving device and the second readout signal indicating the second light component of the first reading light received by the second receiving device. The second differential signal output device outputs the second differential signal representing a difference between the third readout signal indicating the first light component of the second reading light received by the third receiving device and the fourth readout signal indicating the second light component of the second reading light received by the fourth receiving device. Since the super resolution reproduction is performed by using the first reading light and the conventional reproduction is performed by using the second reading light, the first differential signal includes the information of the effect of the double refraction and the information of the size of the low temperature domain and the second differential signal includes only the information of the double refraction.

Therefore, the double refraction eliminating device can eliminate the effect of the double refraction in response to the first and second differential signals. Since the effect of double refraction is eliminated, the direct-current component of the third differential signal outputted by the double refraction eliminating device represents the size of the low temperature domain.

Thus, since the first control device controls the laser power of the irradiation device so that the direct-current component of the third differential signal may be constant, the size of the low temperature domain becomes stable. Therefore, the super resolution reproduction can be stable.

Further, the double refraction eliminating device may include: a third differential signal output device for outputting the third differential signal representing a difference between the first differential signal and the second differential signal. Additionally, the double refraction eliminating device may include: a differentiating device for differentiating the third differential signal and outputting a differentiated signal of the third differential signal; and a second control device for controlling the power of the reading light from the light irradiation device so that a deviation of the third differential signal at a time of the differentiated signal being zero is minimized.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the accompany drawings:

FIG. 10 is a block diagram of a reproduction circuit used for the optical disk reproducing apparatus shown in FIG. 6;

DESCRIPTION OF THE PREFERRED EMBODIMENTS

A preferred embodiment according to the present invention will now be described below with reference to the accompanying drawings. It should be noted that same reference numbers are used to denote same elements.

(I) OPTICAL DISK

Firstly, a construction of an optical record mediums, from which information is reproduced by an optical disk reproducing apparatus of the present invention, will be explained with referring to FIGS. 1, 2 and 3.

i) MSR (Magnetically induced Super Resolution) Disk

Figure 1:
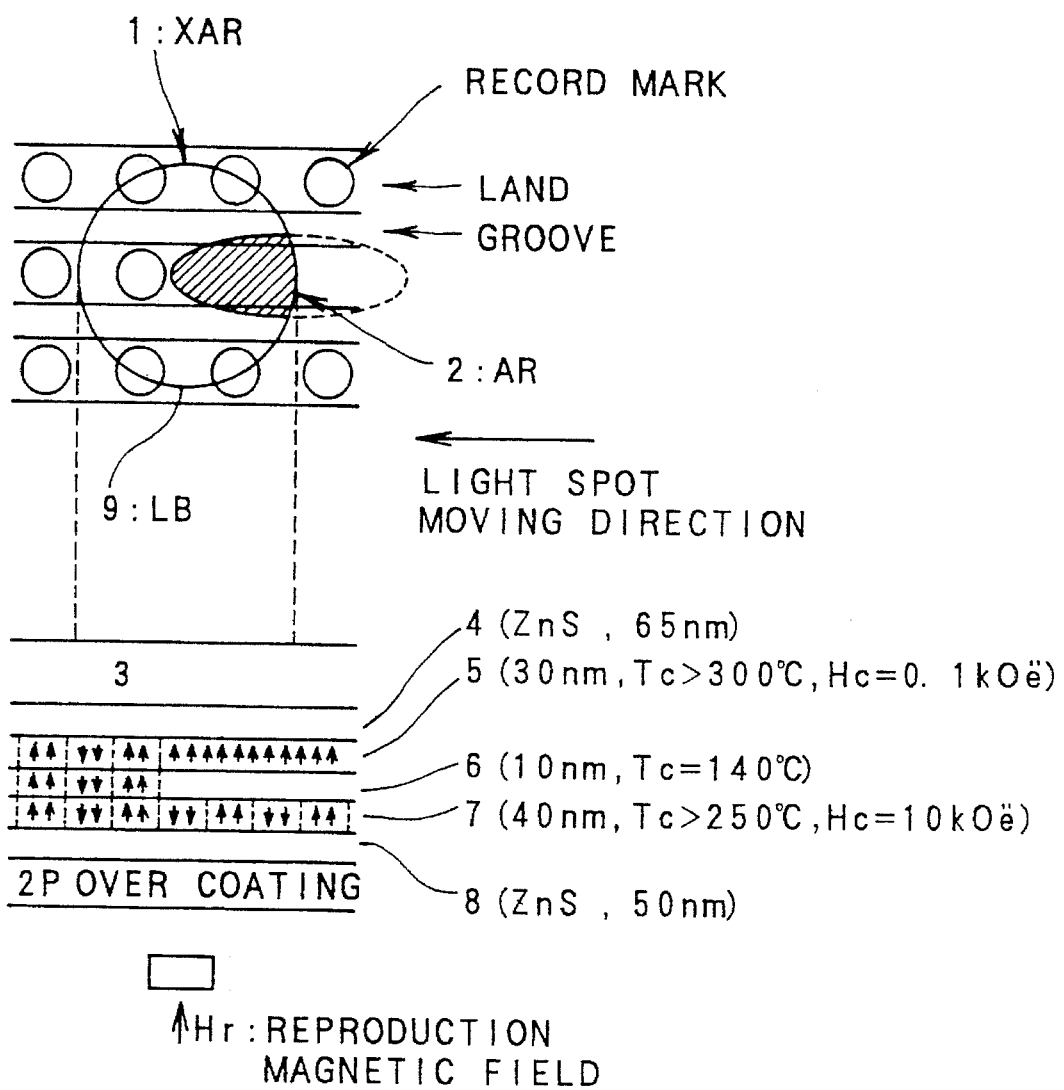
FIG. 1 is a diagram for explaining reproduction principle of a FAD (Front Aperture Detection) type MSR disk.

FIG. 1 is a diagram for explaining the reproduction principle of a FAD (Front Aperture Detection) type MSR disk. As shown FIG. 1, the MSR disk is provided with: a substrate 3, on which groves are formed, having address information in a form of a phase pit along a track and a double refraction reference region for detecting effect of the double refraction; and a information record film, which is provided on the substrate 3, including a first protection film 4, which is provided on the substrate 3, composed of dielectric, a first magnetic film 5 provided on the first protection film 4, a second magnetic film 6 provided on the first magnetic film 5, a third magnetic film 7 provided on the second magnetic film 6, and a second protection film 8, which is provided on the third magnetic film, composed of dielectric.

The first magnetic film 5 may be composed of a GdFeCo and have composition so that magnetic coerce force Hc of the first magnetic film 5 may be weak and perpendicular magnetization may exist in the first magnetic film 5 with respect to wide temperature distribution from room temperature to Curie temperature Tc. In the first magnetic film 5, high temperature domain AR and low temperature domain XAR are formed within a light spot. The second magnetic film 6, which may be composed of a TbFe, is a switching film for switching the switched connection force between the first magnetic film 5 and the third magnetic film 7. The third film, which may be composed of a TbFeCo, is a record film, in which the information to be reproduced are recorded.

ii) ROM Super Resolution Disk

Figure 2:
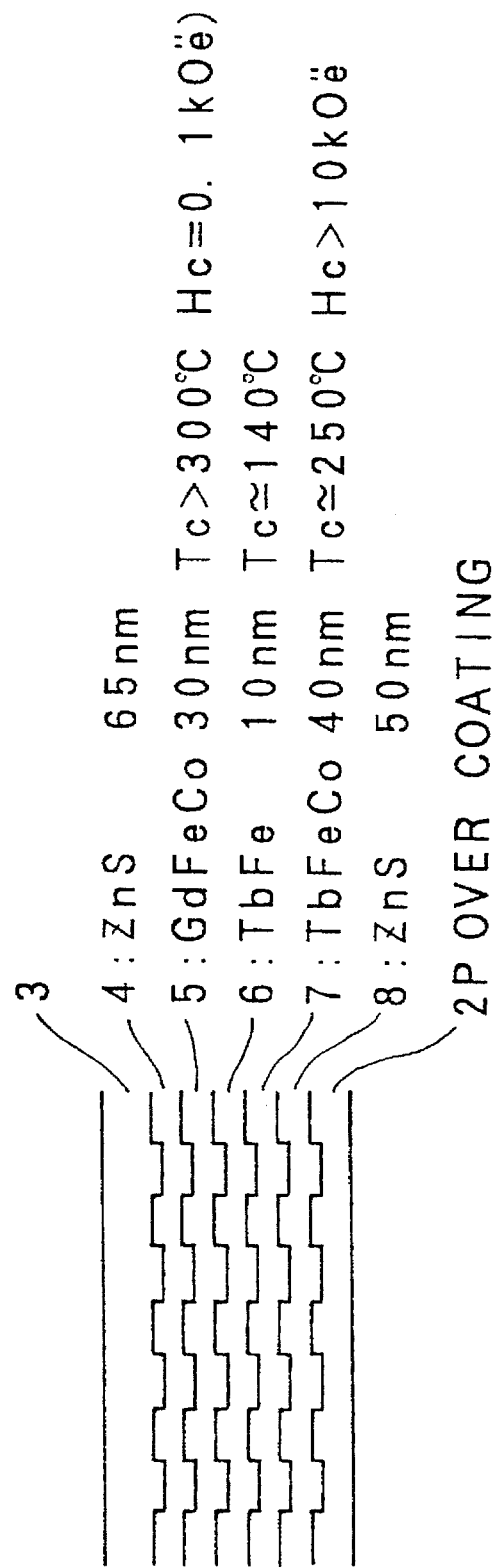
FIG. 2 is a diagram showing a construction of a ROM super resolution disk.
Figure 3:
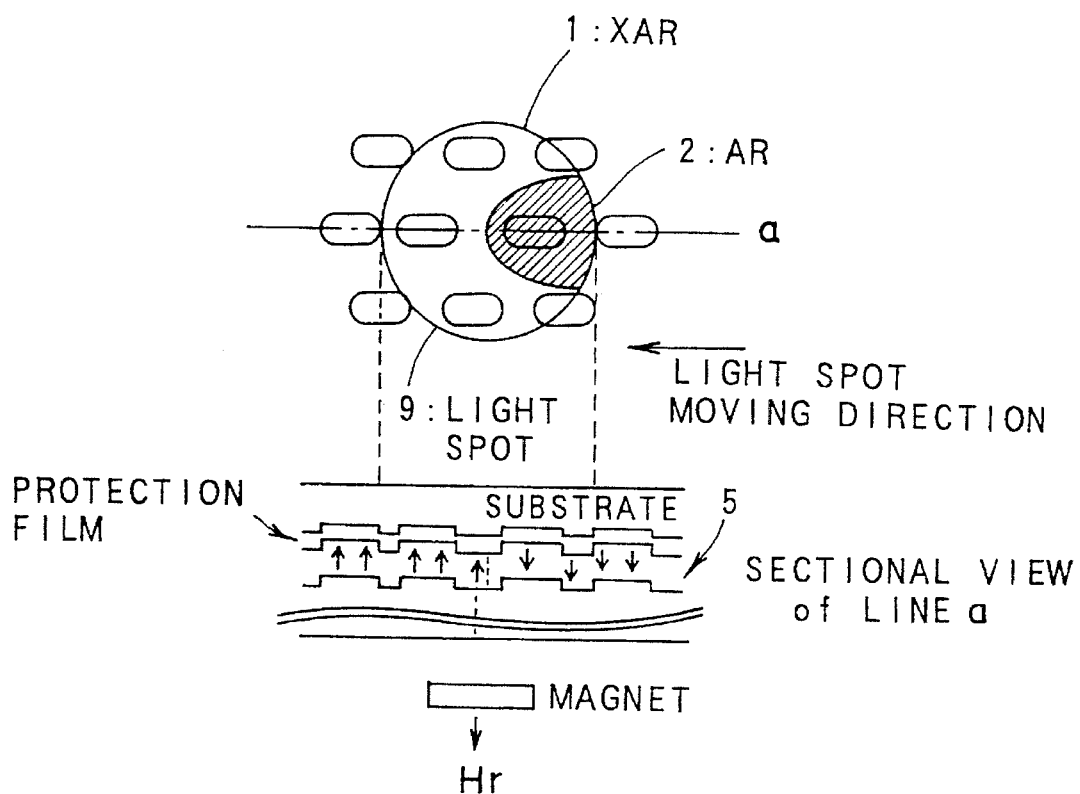
FIG. 3 is a diagram for explaining reproduction principle of a ROM super resolution disk.

FIG. 2 is a diagram showing a construction of a ROM super resolution disk, and FIG. 3 is a diagram for explaining the reproduction principle of a ROM super resolution disk.

As shown in FIG. 2, the ROM super resolution disk is provided with: a substrate 3, which maintains information in a form of a phase pit along a track; a first protection film 4, which is provided on the substrate 3, composed of dielectric; a first magnetic film 5 provided on the first protection film 4; a second magnetic film 6 provided on the first magnetic film 5; a third magnetic film 7 provided on the second magnetic film 6; and a second protection film 8, which is provided on the third magnetic film, composed of dielectric.

The first magnetic film 5 may be composed of a GdFeCo and have composition so that magnetic coerce force Hc of the first magnetic film 5 may be weak and perpendicular magnetization may appear in the first magnetic film 5 with respect to wide temperature distribution from room temperature to Curie temperature Tc. In the first magnetic film 5, which is a film for reproducing information recorded in the ROM super resolution disk, the high temperature domain AR and the low temperature domain XAR appear within a light spot. The second magnetic film 6, which may be composed of a TbFe, is a switching film for switching the switched connection force between the first magnetic film 5 and the third magnetic film 7. The third film, which may be composed of a TbFeCo, is an initialization film for aligning the perpendicular magnetization direction of the first magnetic film 5.

(2) OPTICAL DISK REPRODUCING APPARATUS

Nextly, a construction of an optical disk reproducing apparatus for reproducing the above mentioned optical disks, will be explained with referring to FIGS. 4–13.

The optical disk reproducing apparatus is constructed so that the effect of double refraction may be eliminated. First of all, the method of eliminating the effect of the double refraction of the substrate 3 will be explained below.

Because of the effect of the double refraction and the size of the low temperature domain XAR being varied, the direct-current component of an offset current, which is referred to as "DC offset" hereinafter, is varied. Therefore, the effect of the double refraction should be separated from that of the variation of the size of the low temperature domain XAR.

Here, the relation between the effect of the double refraction and the variation of the size of the low temperature domain XAR will be explained below.

Generally, the effect of the double refraction of the substrate always appears in spite of the reproducing method being changed. However, if materials such as glass, acrylic resin, are used as the substrate, the effect of the double refraction does not appear. In this case, the effect of the double refraction is ignored. In the following explanation, it is supposed that the effect of the double refraction exists.

On the other hand, the size of the low temperature domain XAR is varied only if the super resolution reproduction is performed.

Therefore, the variation of the DC offset according to the effect of the double refraction is eliminated by comparing an amount of reflection light at a time of the super resolution reproduction being performed with that of reflection light at a time of a conventional reproduction, the resolution of which is not so high, being performed. Concretely, since the power of light beam used for the super resolution reproduction is greater than that of the light beam used for the conventional reproduction, the first variation of the DC offset based on the effect of the double refraction is detected by using the light beam having low power for the conventional reproduction and the second variation of the DC offset based on the effect of the double refraction and the variation of size of the low temperature domain XAR is detected by using the light beam having high power for the super resolution reproduction. Thus, the effect of the double refraction can be eliminated by subtracting the first variation from the second variation.

i) Method of Detecting Effect of Double Refraction by Using One Light Beam

A reproduction method by using the laser beam having low power will be explained below.

If the one light beam, the power of which is set for the conventional reproduction, is used as a reading light, a low-pass filtering of a reference signal obtained from a returning light is performed for a first predetermined period so that record mark on the optical disk having a relatively high frequency may be reproduced, and a further low-pass filtering of the reference signal is performed for a second predetermined period so that the record mark may not be reproduced. By constructing as such, the double refraction reference region is provided at predetermined positions on the optical disk. For example, a mirror region for detecting a focus error of a sampled servo substrate, or an address region of a continuous servo substrate may be used as the double refraction reference region. The double refraction reference region other than the mirror region and the address region can particularly be provided on the optical disk.

According to the aforementioned method, the construction of the optical disk reproducing apparatus is not complicated, since the optical disk reproducing apparatus is not provided with a further light beam for detecting the effect of the double refraction.

ii) Method of Detecting Effect of Double Refraction by Using a Plurality of Light Beams If a plurality of light beams are used as the reading light, one of the light beams is used for detecting the effect of the double refraction.

Figure 4:
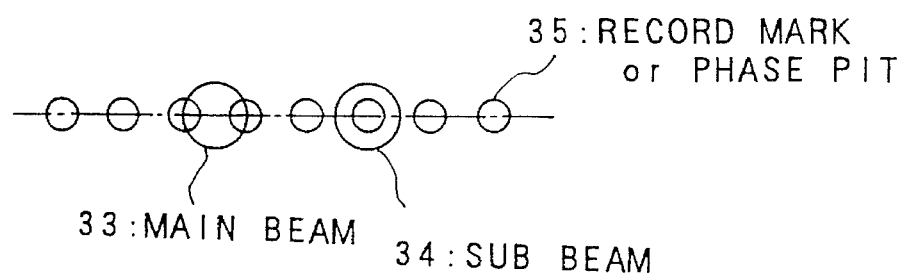
FIG. 4 is a diagram showing a construction of a optical system for detecting an effect of double refraction.
Figure 5:
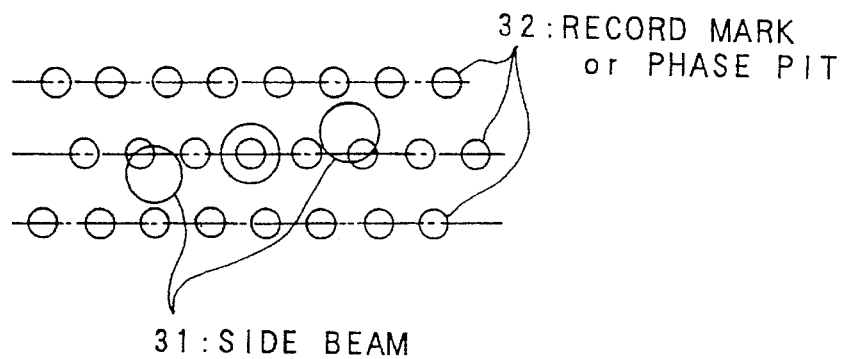
FIG. 5 is a diagram showing a further construction of a optical system for detecting an effect of double refraction.

FIGS. 4 and 5 are diagrams showing constructions of optical systems for detecting the effect of the double refraction.

By way of a example, as shown in FIG. 4, the optical system may be provided with a main light beam 33 having high laser power and a sub light beam 34 having low laser power used for detecting the effect of the double refraction along a track. On the other hand, as shown in FIG. 5, the further optical system may be provided with three light beams including one main light beam and two sub light beams, one of which is used for detecting the effect of the double refraction, having low laser power.

Thus, it may be preferable that a double refraction reference signal representing the effect of the double refraction is obtained by a low-pass filtering of a signal attained from the sub light beam having low laser power.

Since the optical system is provided with a plurality of light beams, the effect of the double refraction can be eliminated without deceasing packing density.

By using one of the aforementioned methods, the effect of the double refraction can be eliminated to obtain information representing the size of the low temperature domain XAR from the variation of DC offset.

The method of eliminating the effect of the double refraction is not limited to the aforementioned methods. The effect of the double refraction can be eliminated by providing another laser beam and by detecting the double refraction from the returning light, to which the another laser beam as a reading light is reflected by the servo region or the address region on the optical disk. Further, the effect of the double refraction can be eliminated by providing another laser beam and by detecting the double refraction from the returning light, to which the another laser beam as a reading light is reflected by a double refraction reference region on the optical disk other than the servo region and the address region.

FIRST EMBODIMENT

Figure 6:
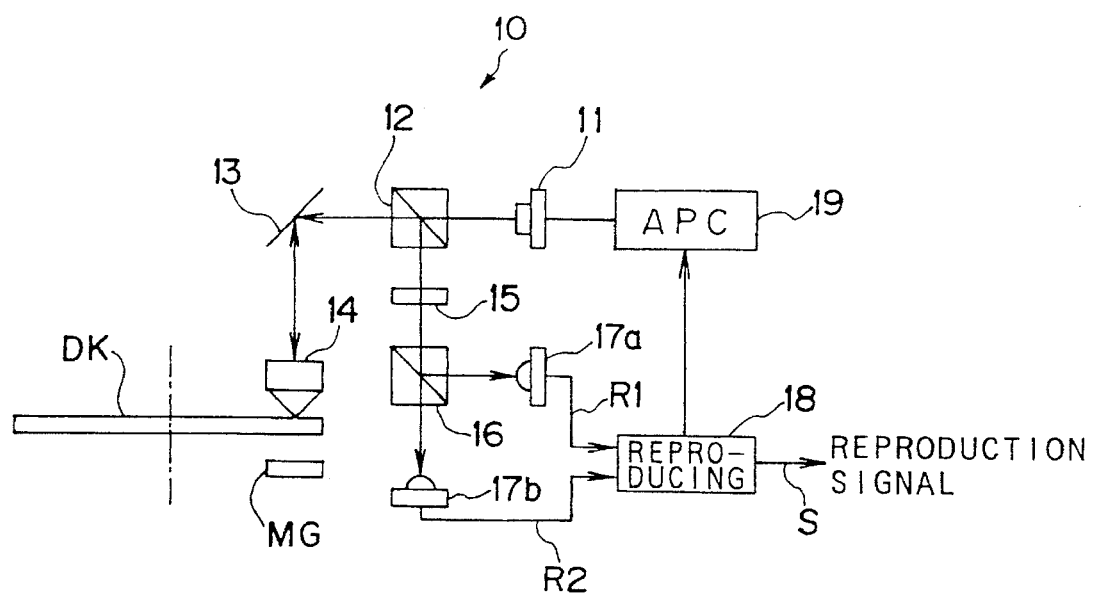
FIG. 6 is a block diagram showing an apparatus for reproducing an optical disk of a first embodiment.

FIG. 6 is a block diagram showing an apparatus for reproducing the optical disk of the first embodiment. In this embodiment, the optical disk reproducing apparatus is provided with one laser beam to reproduce the MSR disk.

An optical disk reproducing apparatus 10 is provided with: a laser diode 11 for emitting a reading laser beam as a reading light; a beam splitter 12 for transmitting the reading laser beam from the laser diode 11 and reflecting the laser beam inputted from a mirror 13; the mirror 13 for guiding the reading laser beam; an objective lens 14 for condensing the reading laser beam onto an information record surface of an optical disk DK; a halfwave plate 15 for adjusting the ratio of the reflected light amount and the transmitted light amount at a light polarization beam splitter 16 of the whole reading laser light (i.e. reproduction light), which are from the nonreading region and reflected by the beam splitter 12; a light polarization beam splitter 16 for transmitting only the polarized light component which has a predetermined light polarization condition, and reflecting other light; a first light receiving element 17a for receiving the polarized light component reflected by the light polarization beam splitter 16, and outputting a first read signal R1 (which is a RF (Radio Frequency) signal); a second light receiving element 17b for receiving the polarized light which has transmitted through the light polarization beam splitter 16, and outputting it as a second read signal R2 (which is a RF signal); a reproducing circuit 18 including a decoder, an amplifier, etc., for changing the read signals into a reproduction signal S, and outputting the signal S and an adjusting signal C1, which corresponds to a differential signal representing a difference between the first read signal R1 and the second read signal R2; a magneto MG for applying a reproduction magnetic field Hr onto the optical disk DK; and a APC (Auto Power Control) circuit 19 for outputting to the laser diode 11 a light diode control signal for controlling a power of the reading laser beam in response to the differential signal.

Nextly, the operation of the reproducing apparatus of the first embodiment will be explained with referring to FIG. 1 and FIG. 6.

The light spot LB of the reading laser beam which is the linearly polarized light emitted from the laser diode 11, is condensed on the information record surface of the optical disk DK through the mirror 13, the beam splitter 12 and the objective lens 14. As shown in FIG. 1, the light spot LB is formed on the track. By rotating the optical disk DK, this light spot LB moves on the track.

Apart from that, the phase pits are formed on the track, which have spacial frequency f (f>fc) exceeding the spatial frequency fc=2 NA/λ prescribed by the numerical aperture NA of the objective lens and the wavelength λ of the reading laser beam. When the temperature of the second magnetic film 6 within the high temperature domain AR rises to exceed the Curie temperature of the second magnetic film 6 by emitting a laser beam, the magnetic domain of the second magnetic film 6 disappears (as indicated by hashed portion in FIG. 1). Then, if the external magnetic field is applied to the optical disk, within the high temperature domain AR the direction of the magnetization of the first magnetic film 5 follows the reproduction field Hr, which is the external magnetic field, since the switched connection force between the first magnetic film 5 and the third magnetic film 7, which has prescribed the magnetization direction, disappears within the high temperature domain AR. As long as the power of the reading laser beam is regulated such that the highest temperature within the light spot becomes lower than the Curie temperature, of each layer other than the second magnetic film 6, the other magnetic domains are not disappeared.

As a result of the above mentioned operations, within the low temperature domain XAR where the magnetization direction of the first magnetic film 5 having the magneto optical effect being reversed, the light polarization direction of the incident reading light is rotated only by the predetermined angle (θ) depending on the first magnetic film 5 according to the result of the magneto optical effect, and the polarized light is returned to the side of the receiving elements 17a and 17b. On the other hand, since the magnetization direction of the first magnetic film 5 within the high temperature domain AR is directed opposite to the magnetization direction of the low temperature domain XAR, the light polarization direction is also rotated only by the predetermined angle (−θ) in the opposite direction. The light polarization condition of the reproduction light is influenced by the light polarization effect in the direction opposite to the magnetization direction in the low temperature domain XAR, and the polarized light is returned to the side of the light receiving elements 17a and 17b in the direction rotated by the predetermined angle (−θ).

The reproduction light from the low temperature domain XAR and the reproduction light from the high temperature domain AR reach the light receiving elements 17a and 17b in the state of the mixture. Here, by adjusting the halfwave plate 15 and setting the positions of the lens and the light receiving elements 17a and 17b, such that the reproduction light from the high temperature domain AR is incident as the light amounts to the first light receiving element 17a and the second light receiving element 17b are equal to each other, and by obtaining the difference (differential signal) between the first read signal R1 and the second read signal R2 at the reproducing circuit 18, the signal components due to the reproduction lights from the high temperature domain AR, cancel each other and are apparently shield. Therefore, in the reproducing circuit 18, only the information in the low temperature domain XAR can be reproduced and the reproduction signal S includes only the information in the low temperature domain XAR.

Subsequently, the control of the APC circuit 19 used for the reproducing apparatus shown in FIG. 6 will be explained with referring to FIGS. 7–9. In the following explanation, it is supposed that the light spot LB is located on non-signal region where record marks are not formed.

Figure 7A:
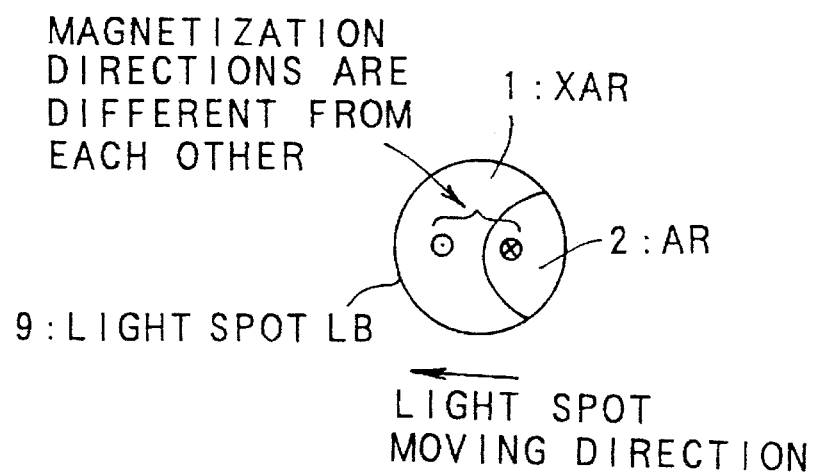
FIG. 7, which consists of FIG. 7a and 7b, are diagrams for explaining the operation of the optical disk reproducing apparatus shown in FIG. 6 under a appropriate condition.
Figure 7B:
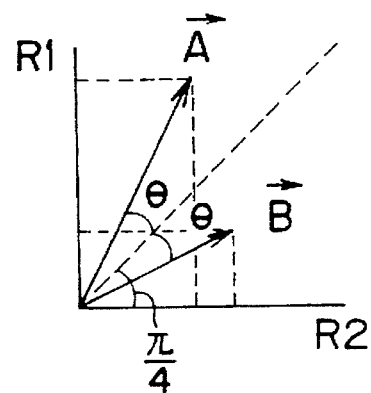

FIG. 7a is a diagram showing the light spot LB including the low temperature domain XAR and the high temperature domain AR under a appropriate condition, in which the laser power of the laser diode 11 is appropriate, and FIG. 7b is a diagram showing a vector A representing a light amount of a returning light form the low temperature domain XAR and a vector B representing a light amount of a returning light form the high temperature domain AR.

Here, a vertical axis R1 represents a light amount, which corresponds to the first read signal R1, received by the first light receiving element 17a, and a horizontal axis R2 represents a light amount, which corresponds to the second read signal R2, received by the second light receiving element 17b. The definitions of the axes R1 and R2 are the same as those of FIGS. 8 and 9.

In case of FIG. 7, in which the laser power of the laser diode 11 is appropriate, a ratio R1/R2 is defined as a symbol "K".

Figure 8A:
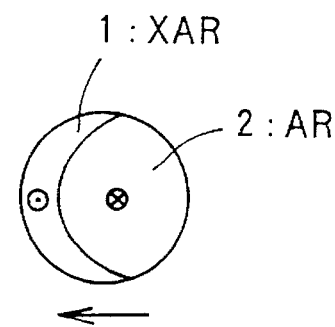
FIG. 8, which consists of FIG. 8a and 8b, are diagrams for explaining the operation of the optical disk reproducing apparatus shown in FIG. 6 in case of a laser power of a laser diode 11 being greater than that of the appropriate condition.
Figure 8B:
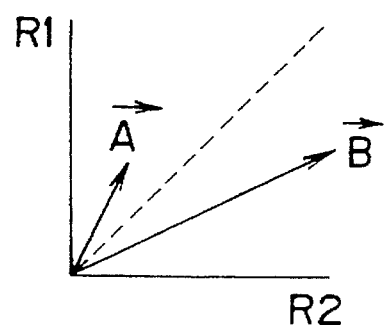

FIG. 8a is a diagram showing the light spot LB including the low temperature domain XAR and the high temperature domain AR in case of the laser power of the laser diode 11 being greater than that of the appropriate condition, and FIG. 8b is a diagram showing a vector A representing a light amount of a returning light form the low temperature domain XAR and a vector B representing a light amount of a returning light form the high temperature domain AR under this condition.

In a case of FIG. 8, in which the laser power of the laser diode 11 is greater than that of the appropriate condition, a ratio R1/R2 is defined as a symbol "K1". In this case, a magnitude of the vector B is greater than that of the vector A as shown in FIG. 8b, since the size of the high temperature domain AR becomes greater than that shown in FIG. 7 as shown in FIG. 8a. Thus, K1 is smaller than K.

Figure 9A:
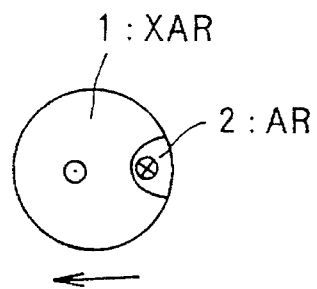
FIG. 9, which consist of FIGS. 9a and 9b, are diagrams for explaining the operation of the optical disk reproducing apparatus shown in FIG. 6 in case of a laser power of a laser diode 11 being smaller than that of the appropriate condition.
Figure 9B:
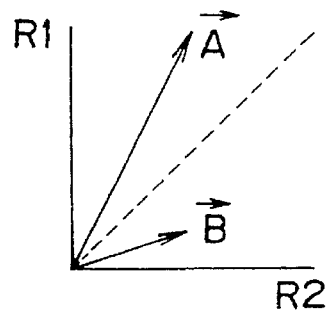

FIG. 9a is a diagram showing the light spot LB including the low temperature domain XAR and the high temperature domain AR in case of the laser power of the laser diode 11 being smaller than that of the appropriate condition, and FIG. 9b is a diagram showing a vector A representing a light amount of a returning light form the low temperature domain XAR and a vector B representing a light amount of a returning light form the high temperature domain AR under this condition.

In a case of FIG. 9, in which the laser power of the laser diode 11 is smaller than that of the appropriate condition, a ratio R1/R2 is defined as a symbol "K2". In this case, a magnitude of the vector B is smaller than that of the vector A as shown in FIG. 9b, since the size of the high temperature domain AR becomes smaller than that shown in FIG. 7, as shown in FIG. 9a. Thus, K2 is greater than K.

Therefore, in case of FIG. 8, in which R1/R2 is smaller than K, the APC circuit 19 supplies the light diode control signal to the laser diode 11 so that the laser power of the laser diode may become small. On the other hand, in case of FIG. 9, in which R1/R2 is greater than K, the APC circuit 19 supplies the light diode control signal to the laser diode 11 so that the laser power of the laser diode may become great.

A Further Reproducing Circuit

Nextly, the construction of a further reproducing circuit used for the optical disk reproducing apparatus will be explained in greater detail with referring to FIG. 10.

FIG. 10 is a block diagram of a further reproducing circuit used for the optical disk reproducing apparatus shown in FIG. 6.

The reproduction circuit shown in FIG. 10 is provided with: a first high-pass filter 51 for receiving the first read signal R1 and extracting the high frequency component thereof; a second high-pass filter 52 for receiving the second read signal R2 and extracting the high frequency component thereof; a first differential amplifier 53 for receiving the first and second read signals, which are high-pass filtered, and outputting a first differential signal as the reproduction signal; a first low-pass filter 54 for receiving the first read signal R1 and extracting the low frequency component thereof in order to detect the variation of the low frequency component; a second low-pass filter 55 for receiving the second read signal R2 and extracting the low frequency component thereof in order to detect the variation of the low frequency component; and a second differential amplifier 56 for receiving the first and second read signals, which are low-pass filtered, and outputting a second differential signal.

The reproduction circuit shown in FIG. 10 is further provided with: a double refraction eliminating circuit 63 for eliminating the effect of the double refraction from the second differential signal.

The double refraction eliminating circuit 63 is provided with: a sampling circuit 57 for receiving the second differential signal and sampling it at regular intervals in response to a laser power control signal C2, which is supplied from a CPU (Central Processing Unit)(not shown), for switching the laser power of the laser diode 11 to high or low; a memory 58 for storing a sampled signal B supplied from the sampling circuit 57 when the laser power of the laser diode 11 is a low level and outputting the sampled signal B; a third differential amplifier 59, which includes an anti-inversion terminal for receiving a signal A supplied from the sampling circuit 57 when the laser power of the laser diode 11 is a high level and an inversion terminal for receiving the signal B outputted from the memory 58, for outputting a third differential signal C representing the difference between the signal A and the signal B; a differentiator 60 for differentiating the signal C and outputting a differentiated signal D; and a laser power adjusting circuit 61 for receiving the signal C and the differentiated signal D and outputting a adjusting signal C1 for adjusting in exactly the laser power of the laser diode 11 according to whether the deviation of the signal C from a predetermined level at a time of the differentiated signal D being zero is positive or negative.

Additionally, a laser driver 62, which corresponds to the APC circuit 19, for receiving the adjusting signal C1 and the laser power control signal C2 and outputting a laser diode control signal C3 for driving the laser diode 11 at a predetermined laser power according to the signals C1 and C2, is also shown in FIG. 10.

Nextly, the operation of the reproducing circuit will be explained below.

The first differential amplifier 53 receives the first and second read signals, which are high-pass filtered, and outputs the first differential signal as the reproduction signal.

In order to detect the variation of the low frequency component, the second differential amplifier 56 receives the first and second read signals R1 and R2, which are low-pass filtered, and outputs the second differential signal representing the difference between the first and second read signals to the double refraction eliminating circuit 63.

The sampling circuit 57, which is included in the double refraction eliminating circuit 63, performs a sampling of the second differential signal at regular intervals in response to the laser power control signal C2. The sampling circuit 57 supplies the signal A, which represents a sampled signal of the second differential signal when the laser power of the laser diode 11 is the high level, to the anti-inversion terminal of the third differential amplifier 59. Further, the sampling circuit 57 supplies to the memory 58 the signal B, which represents a sampled signal of the second differential signal when the laser power of the laser diode 11 is a low level. The memory 58 stores the sampled signal B and continuously supplies the signal B to the inversion terminal of the third differential amplifier 59. The signal B includes information only representing the effect of the double refraction, since the signal B is sampled when the laser power of the laser diode 11 is the low level. On the other hand, the signal A includes the information representing the effect of the double refraction and that of the size of the low temperature domain. The third differential amplifier 59 receives the signals A at the anti-inversion terminal and the signal B at the inversion terminal, in which the polarity of the signal B is inverted. Therefore, the third differential amplifier 59 outputs the third differential signal C representing the difference between the signal A and the signal B. Thus, since the information representing the effect of the double refraction is eliminated from the signal A, the third differential signal C, which only includes the information representing the size of the low temperature domain, can be obtained.

The differentiator 60 differentiates the signal C and outputs a differentiated signal D to the laser power adjusting circuit 61. The laser power adjusting circuit 61 outputs the adjusting signal C1 to the laser driver 62 in order to adjust in exactly the laser power of the laser diode 11. Concretely, if the deviation of the signal C from the predetermined level, which is predetermined under the appropriate condition, at a time of the differentiated signal D being zero is positive, the laser power of the laser diode 11 is decreased. On the other hand, if the deviation of the signal C from the predetermined level at a time of the differentiated signal D being zero is negative, the laser power of the laser diode 11 is increased.

Therefore, since the effect of the double refraction is eliminated and the DC offset corresponding to the size of the low temperature domain XAR is always obtained, the laser diode control signal C3 is prescribed so that the deviation of the signal C from the predetermined level at a time of the differentiated signal D being zero may be minimized. Thus, the super resolution reproduction can be stable.

Figure 11A:
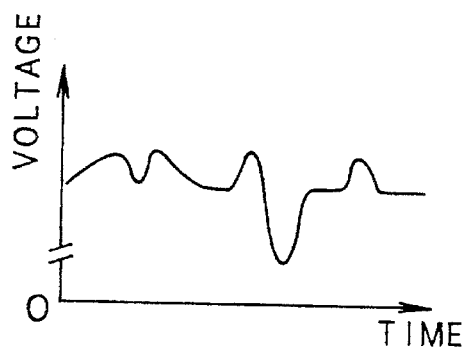
FIG. 11, which consist of FIG. 11a is a diagram showing a wave form of signal A.
FIG. 11b is a diagram showing a wave form of signal B.
FIG. 11c is a diagram showing a wave form of signal C.
FIG. 11d is a diagram showing a wave form of signal D.
Figure 11B:
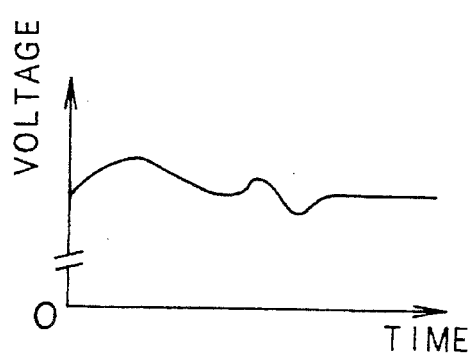
Figure 11C:
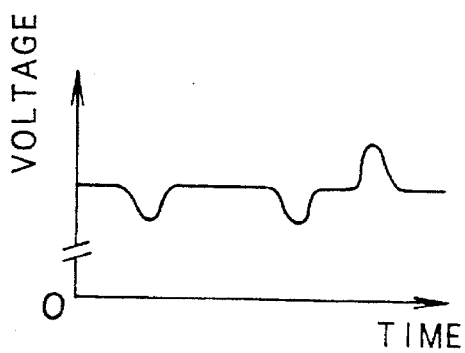
Figure 11D:
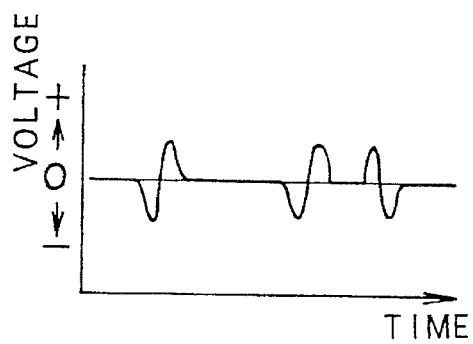

FIG. 11a is a diagram showing a wave form of signal A, FIG. 11b is a diagram showing a wave form of signal B, FIG. 11c is a diagram showing a wave form of signal C, and FIG. 11d is a diagram showing a wave form of signal D.

SECOND EMBODIMENT

Figure 12:
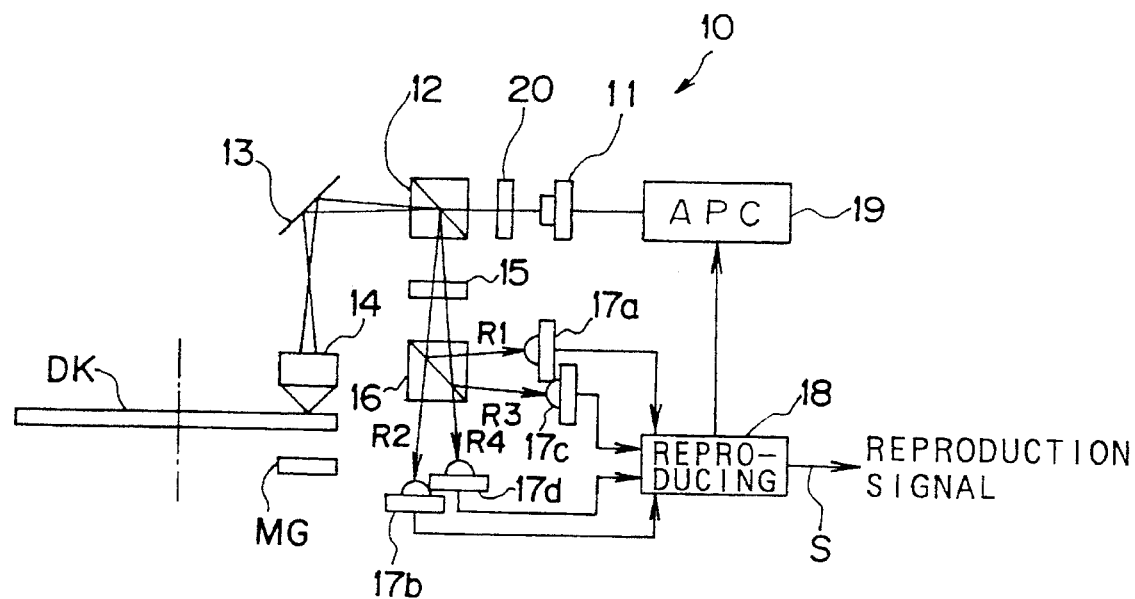
FIG. 12 is a block diagram showing an apparatus for reproducing an optical disk of a second embodiment.

FIG. 12 is a block diagram showing an apparatus for reproducing the optical disk of the second embodiment. In this embodiment, the optical disk reproducing apparatus is provided with two laser beams to reproduce the ROM super resolution disk.

In comparison with the optical disk reproducing apparatus shown in FIG. 6, the optical disk reproducing apparatus shown in FIG. 12 is further provided with a diffraction grating 20 for dividing a reading laser beam emitted from a laser diode 11 into a 0 order light beam, a (+1) order light beam and a (−1) order light beam. A optical system of the optical disk reproducing apparatus of second embodiment is constructed so that the 0 order light beam and the (+1) order light beam (or the (−1) order light beam) may be located on the same track. The 0 order light beam is used for obtaining a reproduction signal S and the information representing the size of the low temperature domain XAR and the effect of the double refraction. The (+1) order light beam or the (−1) order light beam is used for obtaining the information representing the effect of the double refraction. The powers of 0 order light beam, the (+1) order light beam, and the (+1) order light beam are adjusted so that a super resolution reproduction may be performed by using the 0 order light beam and a conventional reproduction may be performed by using the (+1) order light beam or the (+1) order light beam. In the following explanation, it is supposed that the (+1) order light beam is used for obtaining the information representing the effect of the double refraction.

An optical disk reproducing apparatus 10, shown in FIG. 12, is provided with: the laser diode 11 for emitting the reading laser beam as the reading light; the diffraction grating 20 for dividing the reading laser beam emitted from a laser diode 11 into the 0 order light beam, the (+1) order light beam and the (−1) order light beam; a beam splitter 12 for transmitting the 0 order light beam and the (+1) order light beam from the diffraction granting 20 and reflecting the light beams inputted from a mirror 13; the mirror 13 for guiding the 0 order light beam and the (+1) order light beam; an objective lens 14 for condensing the 0 order light beam and the (+1) order light beam onto an information record surface of an optical disk DK; a halfwave plate 15 for adjusting the ratio of the reflected light amount and the transmitted light amount at a light polarization beam splitter 16 of the whole reading laser light (i.e. reproduction light), which are from the nonreading region and reflected by the beam splitter 12; a light polarization beam splitter 16 for transmitting only the polarized light component which has a predetermined light polarization condition, and reflecting other light; a first light receiving element 17a for receiving the polarized light component of the 0 order light beam reflected by the light polarization beam splitter 16, and outputting a first read signal R1 (which is a RF (Radio Frequency) signal); a second light receiving element 17b for receiving the polarized light of the 0 order light beam which has transmitted through the light polarization beam splitter 16, and outputting it as a second read signal R2 (which is a RF signal); a third light receiving element 17c for receiving the polarized light component of the (+1) order light beam reflected by the light polarization beam splitter 16, and outputting a third read signal R3 (which is a RF (Radio Frequency) signal); a fourth light receiving element 17d for receiving the polarized light of the (+1) order light beam which has transmitted through the light polarization beam splitter 16, and outputting it as a fourth read signal R4 (which is a RF signal); a reproducing circuit 18 including a decoder, an amplifier, etc., for changing the first and second read signals R1 and R2 into a reproduction signal S, and outputting the signal S and a adjusting signal C1, which corresponds to a differential signal representing a difference between the first read signal R1 and the second read signal R2, after the effect of the double refraction is eliminated; a magneto MG for applying a reproduction magnetic field Hr onto the optical disk DK; and a APC (Auto Power Control) circuit 19 for outputting to the laser diode 11 a light diode control signal for controlling a power of the reading laser beam in response to the differential signal.

Nextly, the operation of the reproducing apparatus of the second embodiment will be explained with referring to FIG. 3 and FIG. 12.

The light spot LB of the 0 order light beam which is the linearly polarized light emitted from the laser diode 11 through the diffraction grating 20, is condensed on the information record surface of the optical disk DK through the mirror 13, the beam splitter 12 and the objective lens 14. As shown in FIG. 3, the light spot LB is formed on the track. By rotating the optical disk DK, this light spot LB moves on the track.

Apart from that, the phase pits are formed on the track, which have spacial frequency f (f>fc) exceeding the spatial frequency fc=2 NA/λ prescribed by the numerical aperture NA of the objective lens and the wavelength λ of the reading laser beam. When the temperature of the second magnetic film 6 within the high temperature domain AR rises to exceed the Curie temperature of the second magnetic film 6 by emitting a laser beam, the magnetic domain of the second magnetic film 6 disappears. Then, if the external magnetic field is applied to the optical disk, within the high temperature domain AR the direction of the magnetization of the first magnetic film 5 follows the reproduction field Hr, which is the external magnetic field, since the switched connection force between the first magnetic film 5 and the third magnetic film 7, which has prescribed the magnetization direction, disappears within the high temperature domain AR. As long as the power of the reading laser beam is regulated such that the highest temperature within the light spot becomes lower than the Curie temperature, of each layer other than the second magnetic film 6, the other magnetic domains are not disappeared.

As a result of the above mentioned operations, within the low temperature domain XAR where the magnetization direction of the first magnetic film 5 having the magneto optical effect being reversed, the light polarization direction of the incident reading light is rotated only by the predetermined angle (θ) depending on the first magnetic film 5 according to the result of the magneto optical effect, and the polarized light is returned to the side of the receiving elements 17a and 17b. On the other hand, since the magnetization direction of the first magnetic film 5 within the high temperature domain AR is directed opposite to the magnetization direction of the low temperature domain XAR, the light polarization direction is also rotated only by the predetermined angle (−θ) in the opposite direction. The light polarization condition of the reproduction light is influenced by the light polarization effect in the direction opposite to the magnetization direction in the low temperature domain XAR, and the polarized light is returned to the side of the light receiving elements 17a and 17b in the direction rotated by the predetermined angle (−θ).

The reproduction light from the low temperature domain XAR and the reproduction light from the high temperature domain AR reach the light receiving elements 17a and 17b in the state of the mixture. Here, by adjusting the halfwave plate 15 and setting the positions of the lens and the light receiving elements 17a and 17b, such that the reproduction light from the high temperature domain AR is incident as the light amounts to the first light receiving element 17a and the second light receiving element 17b are equal to each other, and by obtaining the difference (differential signal) between the first read signal R1 and the second read signal R2 at the reproducing circuit 18, the signal components due to the reproduction lights from the high temperature domain AR, cancel each other and are apparently shield. Therefore, in the reproducing circuit 18, only the information in the low temperature domain XAR i.e. the phase pit P, can be reproduced and the reproduction signal S includes only the information of the phase pit P.

On the other hand, the light spot of the (+1) order light beam which is the linearly polarized light emitted from the laser diode 11 through the diffraction grating 20, is condensed on the information record surface of the optical disk DK through the mirror 13, the beam splitter 12 and the objective lens 14. The light spot of the (+1) order light beam is formed on the track. By rotating the optical disk DK, this light spot LB moves on the track.

As the light spot of the (+1) order light beam consists of the low temperature domain where the magnetization direction of the first magnetic film 5 having the magneto optical effect is reversed, the light polarization direction of the incident reading light is rotated only by the predetermined angle (θ) depending on the first magnetic film 5 according to the result of the magneto optical effect, and the polarized light is returned to the side of the receiving elements 17c and 17d.

The information only representing the effect of the double refraction is obtained from a differential signal prescribed by the difference between the third read signal and the fourth read signal.

The explanation with respect to the control of the APC circuit 19 shown in FIG. 12 is the same as that of shown in FIG. 6 with referring to FIGS. 7–9.

Another Reproducing Circuit

Nextly, the construction of another reproducing circuit used for the optical disk reproducing apparatus will be explained in greater detail with referring to FIG. 13.

Figure 13:
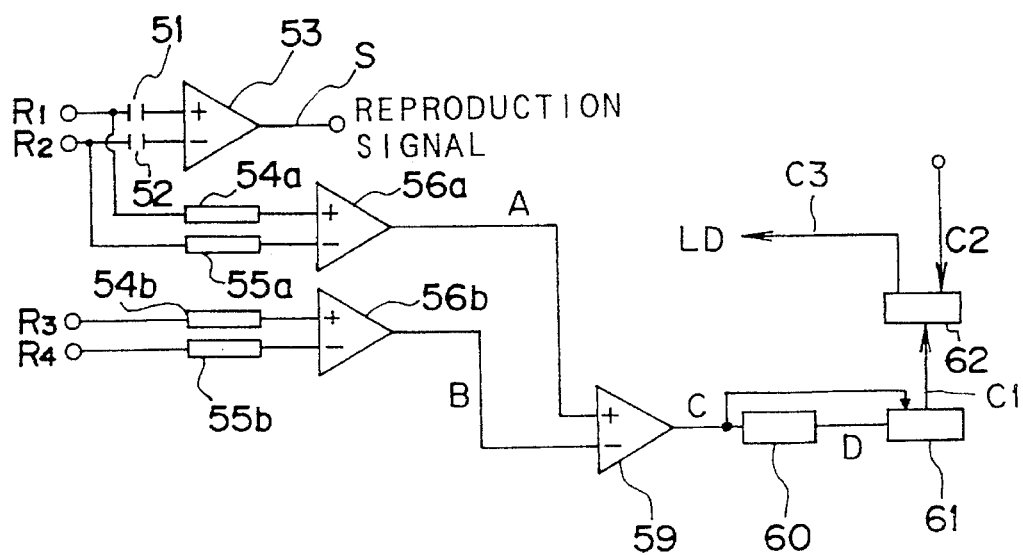
FIG. 13 is a block diagram of another reproducing circuit used for the optical disk reproducing apparatus shown in FIG. 12.

FIG. 13 is a block diagram of another reproducing circuit used for the optical disk reproducing apparatus shown in FIG. 12.

The reproduction circuit shown in FIG. 13 is provided with: a first high-pass filter 51 for receiving the first read signal R1 and extracting the high frequency component thereof; a second high-pass filter 52 for receiving the second read signal R2 and extracting the high frequency component thereof; a first differential amplifier 53 for receiving the first and second read signals R1 and R2, which are high-pass filtered, and outputting a first differential signal as the reproduction signal; a first low-pass filter 54a for receiving the first read signal R1 and extracting the low frequency component thereof in order to detect the variation of the low frequency component; a second low-pass filter 55a for receiving the second read signal R2 and extracting the low frequency component thereof in order to detect the variation of the low frequency component; a second differential amplifier 56a for receiving the first and second read signals R1 and R2, which are low-pass filtered, and outputting a second differential signal A; a third low-pass filter 54b for receiving the third read signal R3 and extracting the low frequency component thereof in order to detect the variation of the low frequency component; a fourth low-pass filter 55b for receiving the fourth read signal R4 and extracting the low frequency component thereof in order to detect the variation of the low frequency component; a third differential amplifier 56b for receiving the third and fourth read signals R3 and R4, which are low-pass filtered, and outputting a third differential signal B; a fourth differential amplifier 59, which includes an anti-inversion terminal for receiving the second differential signal A and an inversion terminal for receiving the third differential signal B, for outputting a fourth differential signal C representing the difference between the signal A and the signal B; a differentiator 60 for differentiating the signal C and outputting a differentiated signal D; and a laser power adjusting circuit 61 for receiving the signal C and the differentiated signal D and outputting a adjusting signal C1 for adjusting in exactly the laser power of the laser diode 11 according to whether the deviation of the signal C from a predetermined level at a time of the differentiated signal D being zero is positive or negative.

Additionally, a laser driver 62, which corresponds to the APC circuit 19, for receiving the adjusting signal C1 and the laser power control signal C2 and outputting a laser diode control signal for driving the laser diode 11 at a predetermined laser power according to the signals C1 and C2 is also shown in FIG. 13.

Nextly, the operation of the reproducing circuit will be explained below.

The first differential amplifier 53 receives the first and second read signals R1 and R2, which are high-pass filtered, and outputs the first differential signal as the reproduction signal.

The second differential amplifier 56a receives the first and second read signals, which are low-pass filtered, and outputs the second differential signal A representing the difference between the first and second read signals. The second differential signal A includes the information representing the size of the low temperature domain XAR and the information representing the effect of the double refraction, since the power of 0 order light beam is adjusted so that the super resolution reproduction may be performed by using the 0 order light beam.

The third differential amplifier 56b receives the third and fourth read signals R3 and R4, which are low-pass filtered, and outputs the third differential signal B representing the difference between the third and fourth read signals R3 and R4. The third differential signal B includes the information only representing the effect of the double refraction, since the powers of (+1) order light beam is adjusted so that the conventional resolution reproduction may be performed by using the (+1) order light beam.

The third differential amplifier 59 receives the signals A at the anti-inversion terminal and the signal B at the inversion terminal, in which the polarity of the signal B is inverted. Therefore, the third differential amplifier 59 outputs the fourth differential signal C representing the difference between the signal A and the signal B. Thus, since the information of the double refraction is eliminated from the signal A, the fourth differential signal C, which only includes the information of the size of the low temperature domain, can be obtained.

The differentiator 60 differentiates the signal C and outputs a differentiated signal D to the laser power adjusting circuit 61. The laser power adjusting circuit 61 outputs the adjusting signal C1 to the laser driver 62 in order to adjust in exactly the laser power of the laser diode 11. Concretely, if the deviation of the signal C from the predetermined level, which is predetermined under the appropriate condition, at a time of the differentiated signal D being zero is positive, the laser power of the laser diode 11 is decreased. On the other hand, if the deviation of the signal C from the predetermined level at a time of the differentiated signal D being zero is negative, the laser power of the laser diode 11 is increased.

Therefore, since the effect of the double refraction is eliminated and the DC offset corresponding to the size of the low temperature domain XAR is always obtained, the laser diode control signal C3 is prescribed so that the deviation of the signal C from the predetermined level at a time of the differentiated signal D being zero may be minimized. Thus, the super resolution reproduction can be stable.

Each of wave forms shown in FIGS. 11a, 11b, 11c and 11d respectively corresponds to each of wave forms of signals A, B, C and D.

According to the construction of the present invention, since the effect of the double refraction is eliminated and the DC offset corresponding to the size of the low temperature domain XAR is always obtained, the laser diode control signal C3 is prescribed so that the deviation of the signal C from the predetermined level may be minimized and the DC offset may substantially be constant. Since the laser power of the laser diode 11 is controlled as such, the size of the low temperature domain is substantially constant. Thus, the super resolution reproduction can be stable.

The present invention may be embodied in other preferred forms without departing from the spirit or essential characteristics thereof, The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reproducing an optical record medium by irradiating the optical record medium with a reading light, said apparatus comprising:

a light irradiation means for irradiating the optical record medium with the reading light;

a separation means for separating the reading light reflected by the optical record medium into a first light component which has a first polarization condition and a second light component which has a second polarization condition;

a first receiving means for receiving said separated first light component and outputting a first readout signal indicating the received first light component;

a second receiving means for receiving said separated second light component and outputting a second readout signal indicating the received second light component;

a reproduction means for reproducing information recorded in the optical record medium in response to the first and second readout signals;

a first differential signal output means for outputting a first differential signal representing a difference between the first readout signal and the second readout signal;

a double refraction eliminating means for eliminating an effect of double refraction caused by a reflection of the reading light on the optical record medium from the first differential signal and outputting a second differential signal; and a first control means for controlling a power of the reading light from the light irradiation means so that a direct-current component of the second differential signal is constant.

2. An apparatus according to claim 1, further comprising: a light power switching means for switching the power of the reading light from the light irradiation means between a high power and a low power, and wherein said double refraction eliminating means comprises a second differential signal output means for outputting a second differential signal representing a difference between the first differential signal in case of the reading light from the irradiation means having the high power and the first differential signal in case of the reading light from the irradiation means having the low power.

3. An apparatus according to claim 2, wherein said double refraction eliminating means comprises:

a differentiating means for differentiating the second differential signal and outputting a differentiated signal of the second differential signal; and a second control means for controlling the power of the reading light from the light irradiation means so that a deviation of the second differential signal at a time of the differentiated signal being zero is minimized.

4. An apparatus for reproducing an optical record medium by irradiating the optical record medium with a reading light, said apparatus comprising:

a light irradiation means for irradiating the optical record medium with the reading light;

a first separation means for separating the reading light from the light irradiation means into a first reading light having a first power and a second reading light having a second power being smaller than the first power;

a second separation means for separating the first reading light reflected by the optical record medium into a first light component which has a first polarization condition and a second light component which has a second polarization condition, and separating the second reading light reflected by the optical record medium into the first light component which has the first polarization condition and the second light component which has the second polarization condition;

a first receiving means for receiving said separated first light component of the first reading light and outputting a first readout signal indicating the received first light component of the first reading light;

a second receiving means for receiving said separated second light component of the first reading light and outputting a second readout signal indicating the received second light component of the first reading signal;

a third receiving means for receiving said separated first light component of the second reading light and outputting a third readout signal indicating the received first light component of the second reading light;

a fourth receiving means for receiving said separated second light component of the second reading light and outputting a fourth readout signal indicating the received second light component of the second reading signal;

a reproduction means for reproducing information recorded in the optical record medium in response to the first and second readout signals;

a first differential signal output means for outputting a first differential signal representing a difference between the first readout signal and the second readout signal;

a second differential signal output means for outputting a second differential signal representing a difference between the third readout signal and the fourth readout signal;

a double refraction eliminating means for eliminating an effect of double refraction caused by a reflection of the first reading light on the optical record medium in response to the first and second differential signals, and outputting a third differential signal; and a first control means for controlling a power of the reading light from the light irradiation means so that a direct-current component of the third differential signal is constant.

5. An apparatus according to claim 4, wherein said double refraction eliminating means comprises: a third differential signal output means for outputting the third differential signal representing a difference between the first differential signal and the second differential signal.

6. An apparatus according to claim 5, wherein said double refraction eliminating means further comprises: a differentiating means for differentiating the third differential signal and outputting a differentiated signal of the third differential signal; and a second control means for controlling the power of the reading light from the light irradiation means so that a deviation of the third differential signal at a time of the differentiated signal being zero is minimized.

\* \* \* \* \*